United States Patent
Florin et al.

(10) Patent No.: US 6,943,566 B2
(45) Date of Patent: Sep. 13, 2005

(54) METHOD AND DEVICE FOR MEASURING LEVELS

(75) Inventors: Martin Florin, Bad Berleburg (DE); Werner Schmidt, Nexxar (DE)

(73) Assignee: Abertax Research and Development Ltd., Ta'Xbiex (MT)

( * ) Notice: Subject to any disclaimer, the term of this patent is extended or adjusted under 35 U.S.C. 154(b) by 75 days.

(21) Appl. No.: 10/451,498

(22) PCT Filed: Dec. 18, 2001

(86) PCT No.: PCT/EP01/14980

§ 371 (c)(1),
(2), (4) Date: Sep. 18, 2003

(87) PCT Pub. No.: WO02/50498

PCT Pub. Date: Jun. 27, 2002

(65) Prior Publication Data

US 2004/0070408 A1 Apr. 15, 2004

(30) Foreign Application Priority Data

Dec. 20, 2000 (DE) .......................................... 100 63 557
Feb. 24, 2001 (DE) .......................................... 101 09 152

(51) Int. Cl.⁷ .............................................. G01R 27/26
(52) U.S. Cl. ........................ 324/662; 324/686; 73/304 C
(58) Field of Search ................................. 324/662, 663, 324/682, 686; 73/304 C

(56) References Cited

U.S. PATENT DOCUMENTS

| | | | | |
|---|---|---|---|---|
| 3,665,209 A | * | 5/1972 | Webb et al. | 73/304 C |
| 3,901,079 A | * | 8/1975 | Vogel | 73/304 C |
| 4,021,707 A | * | 5/1977 | Ehret et al. | 73/304 C |
| 5,600,997 A | * | 2/1997 | Kemp et al. | 73/290 V |
| 5,611,240 A | * | 3/1997 | Yamaguchi | 324/663 |
| 6,078,729 A | * | 6/2000 | Kopel | 392/402 |

FOREIGN PATENT DOCUMENTS

DE 19842484 A1 * 12/1999 ............ B67D/5/32

* cited by examiner

Primary Examiner—Vincent Q. Nguyen
Assistant Examiner—Timothy J. Dole
(74) Attorney, Agent, or Firm—Cohen, Pontani, Lieberman & Pavane

(57) ABSTRACT

A sensor is applied to the wall of a container or is integrated into the wall. An alternating voltage is applied to the sensor in order to measure the level of the contents of the container, the capacitance or the electrical field produced being a measure for the fill level.

18 Claims, 4 Drawing Sheets

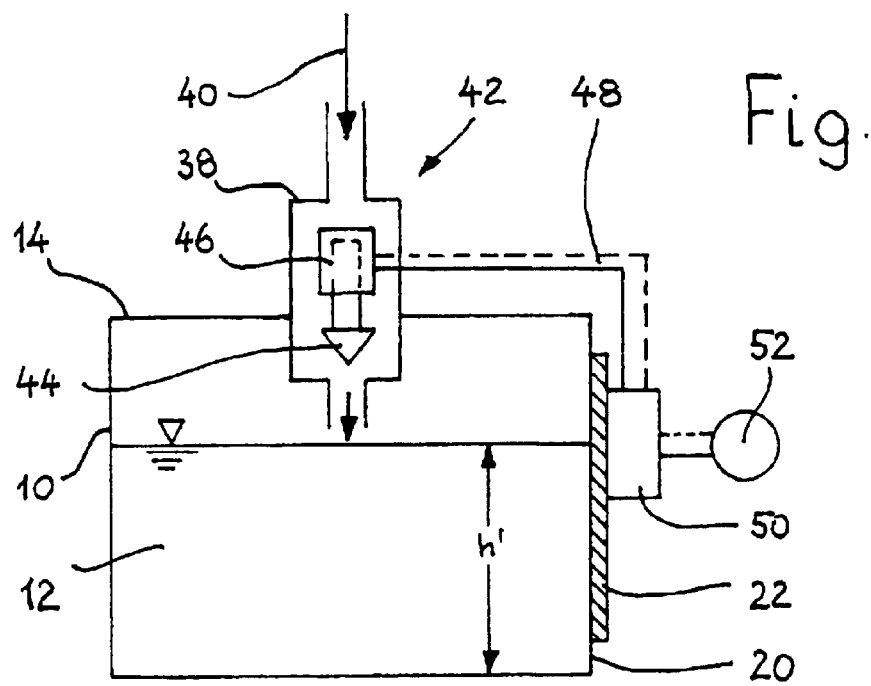
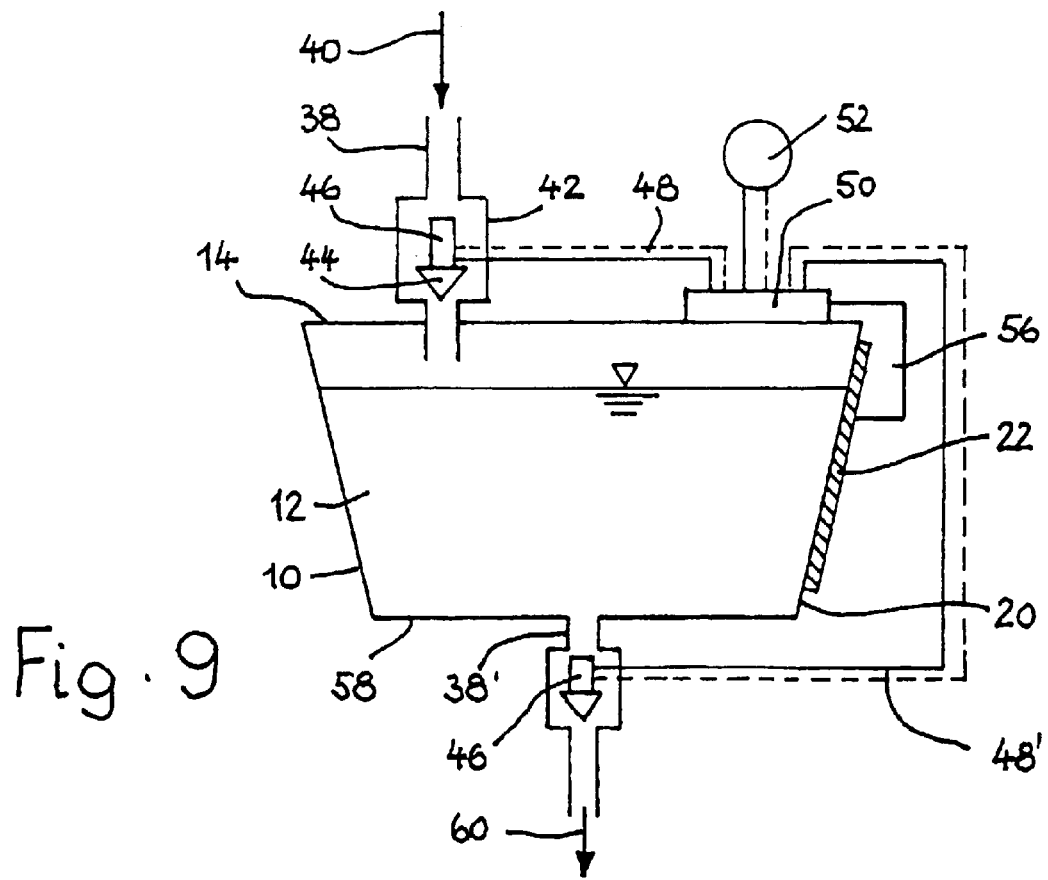

METHOD AND DEVICE FOR MEASURING LEVELS

PRIORITY CLAIM

This is a U.S. national stage of application No. PCT/EP01/14980, filed on 18 Dec. 2001. Priority is claimed on that application and on the following applications: Country: Germany, Application No.: 100 63 557.1, Filed: 20 Dec. 2000; Country: Germany, Application No.: 101 09 152.4, Filed: 24 Feb. 2001.

BACKGROUND OF THE INVENTION

1. Field of the Invention

The invention concerns a method for measuring the level of the contents of a container by a capacitive sensor circuit. The invention also concerns a device for performing the method. The container contents in question include liquids and other fluid substances, pourable solids, such as granules, and even gases.

2. Description of the Related Art

It is already known that the capacitive measurement of the level of a liquid in a container can be carried out by submerging two capacitor plates in the container, whose separating gap is filled partly with the liquid and partly with air as a dielectric. The capacitance of the capacitor formed in this way thus consists of the two partial capacitances corresponding to the different dielectric constants of the two media, air and liquid. There is a linear relationship between the total capacitance of this capacitor and the level of the liquid, so that the level can be determined by determining the total capacitance or the displacement current between the two plates.

A device for level measurement is the object, for example, of EP-A 100 564. A disadvantage of this device is that plates or tubes of a precision capacitor must be submerged in the liquid, which is difficult or impossible in many applications. An example of this is the cells of batteries, which would have to be provided with corresponding holes for this purpose. Furthermore, the capacitor would be exposed to corrosion by the electrolytes and to electrical interference by the charge of the batteries. In other applications, for example, the measurement of the contents of fuel tanks in vehicles or aircrafts, there is the danger that the highly combustible liquid could be ignited by the displacement current that is generated, which means that this system cannot be used for such cases.

U.S. Pat. No. 3,119,266 describes a system for level measurement that requires a capacitive sensor circuit, which consists of two capacitor plates, namely, a container wall and an electrode, both of which are in contact with the contents of the container. These two elements form a capacitor, whose changes in capacitance are measured as a function of the changes in the medium between the capacitor plates. The same comments made above in connection with EP-A 100 560 and the same disadvantages thus apply to this system.

SUMMARY OF THE INVENTION

DE-A 32 48 449 presents and describes a device for measuring the level of liquids, in which a cylindrical, coaxially constructed capacitor is submerged in the liquid and provided with a stationary mount. Due to its design, a device of this type is not suitable for determining filling levels of containers whose contents are in constant motion, for example, the fuel tanks of vehicles or aircrafts.

The object of the invention is to make available a method and a device for the capacitive measurement of the level in a container without having to make suitable adaptations in the container or having to use a capacitor that consists of two plates.

In accordance with the invention, this object is achieved by providing a capacitor consisting of a single, passively acting sensor and the contents of the container; applying alternating voltage to or generating alternating voltage in the contents of the container; measuring the current in the line as a measure of the capacitance of the capacitor; and displaying the capacitance as the level.

The sensor consists of electrically conductive material, e.g., a metal or polymer, and can be designed according to the application, e.g., flat or round.

If the sensor is used as an active sensor, an alternating voltage is applied to it, such that the current strength depends on the height of the level relative to the sensor. The current strength can be displayed as the level after it has been electronically processed.

If it is used as a passive sensor, an alternating voltage is generated in the contents of the container themselves or is supplied from the outside and produces a capacitive alternating current in the sensor, which can be displayed as the level after electronic processing.

In both cases, the sensor signal can be transmitted to the measuring device by an electric line or wirelessly by radio.

Compared to the state of the art, the method and device of the invention have the advantage that one of the two capacitor elements is formed by the contents themselves, while the other capacitor element is the sensor. Therefore, the displacement current passes only through the container wall but not through the contents of the container.

In accordance with another feature of the invention, there is the possibility of connecting the sensor to an alternating voltage source in such a way that an electric field emanating from the sensor is generated. This field varies according to the level in the container (height ratio, contents:air) and can be measured and displayed.

If the level is to be determined as precisely as possible in containers whose position is constantly changing, for example, the level in an aircraft fuel tank, it is possible, in accordance with a refinement of the invention, to place several sensors in different locations and to form a mean value of the signals from all of the sensors. This can be determined with the use of an RC low-pass filter circuit with a time constant of a few seconds.

In accordance with another modification of the invention, the measured level can be connected with a device that automatically corrects the level and/or provides a warning signal when critical filling levels are reached.

The invention is explained below with reference to the embodiments of the invention illustrated in the drawings.

BRIEF DESCRIPTION OF THE DRAWINGS

FIG. 8 is a schematic representation of a battery with an automatic refilling device controlled by the sensor circuit.

FIG. 9 shows a variation of the device in FIG. 8.

DETAILED DESCRIPTION OF THE PRESENTLY PREFERRED EMBODIMENTS

Figure 1:
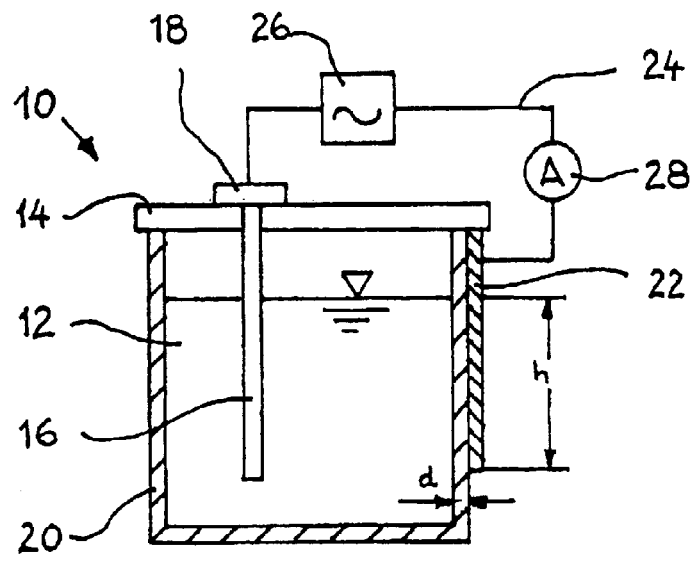
FIG. 1 shows a schematic sectional drawing of a container with a capacitive sensor circuit.

FIG. 1 shows a schematic cross section of a container 10 with its contents 12. The container 10 may be, for example, a fuel tank or a battery cell. The container 10 may have a cylindrical or some other shape and is closed by a cover 14. The thickness of the wall of the container 10 is labeled d.

A rod 16 or a plate passes through the cover 14 of the container 10 to the inside, for example, the lead plate of a battery cell, by means of which the conductive liquid contents 12 can be grounded to increase the effect of the sensor 22, which is explained below. On the outside of the cover 14, the plate 16 has a head 18, by which it is secured.

A sensor 22 of metal is mounted on the outside wall 20 of the container 10. It extends over almost the entire height of the container 10. The sensor 22 is connected with an electric line 24, which is connected to an alternating voltage source 26, which generates an alternating current of frequency f in the line 24. In addition, a measuring or display device 28, for example, an ammeter, is connected in the line 24.

The wall 20 with thickness d between the sensor 22 and the liquid 12 constitutes the dielectric of the capacitor formed by the contents 12 and the sensor 22. The wall 20 is composed of electrically nonconductive material, for example, plastic or glass-fiber material.

According to Coulomb's law, the following applies to capacitance:

$$C = \epsilon_0 \times \epsilon_r \times A/d,$$

where A=area of the capacitor (A=b×h)
with h=height of the sensor 22 up to the filling level, and
  b=width of the sensor 22 (not shown).

According to Ohm's law, the following applies:

$$I = U/X_C$$

where I=current strength measured by the measuring device 28,
  U=voltage generated at the alternating voltage source 26, and
  $X_C$=capacitive reactance,
where $X_C = 1/\omega \times C$
with $\omega = 2\pi f$, and
  f=frequency of the voltage U By combining the two equations of Coulomb and Ohm, the following is obtained for the measured current strength:

$$I = U/d \times \omega \times \epsilon_0 \times \epsilon_r \times b \times h$$

with $$U/d \times \omega \times \epsilon_0 \times \epsilon_r \times b = K (\text{const.})$$

The following linear relationship between the current strength I and the height h is thus obtained:

$$I = K \times h$$

or $$h = I/K.$$

The current strength I thus varies proportionately with the height of the level of the contents 12 in the container 10. It is thus possible to measure the current strength and display it as the level of the contents 12 and/or to use it as an electrical signal to actuate a device of the type shown in FIG. 8 or FIG. 9 for automatically correcting the level (refilling or draining the contents 12).

Figure 2:
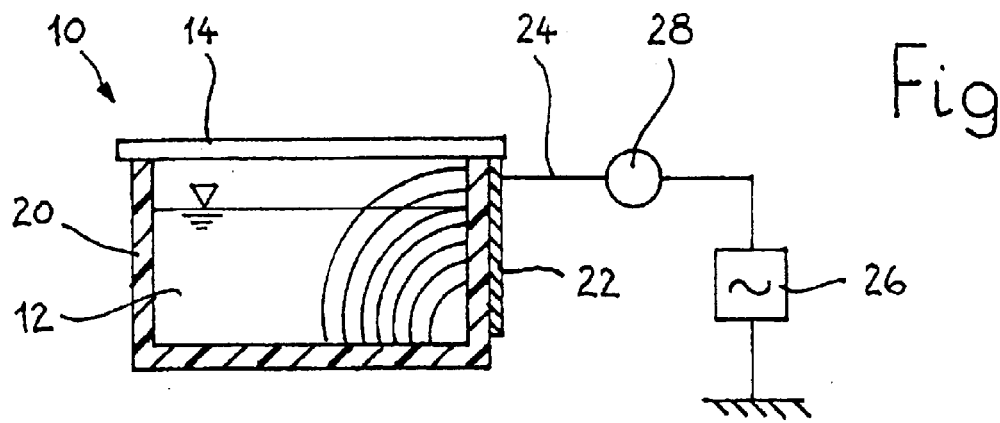
FIG. 2 shows a sectional drawing of a variation of FIG. 1 designed in accordance with the invention.

FIG. 2 shows an embodiment of the invention, according to which the sensor 22, which is mounted on the outside of the container 10, which is made of nonconductive material, is connected with the alternating voltage source 26 in such a way that it generates an electric field, whose lines of force are indicated in FIG. 2. Depending on the nature of the nongrounded contents 12, this field is strengthened or weakened, with the degree of strengthening or weakening depending on the height of the level. The electric field and changes in it can be measured and displayed by the measuring device 28 and can be used to initiate automatic filling level corrections.

Figure 3:
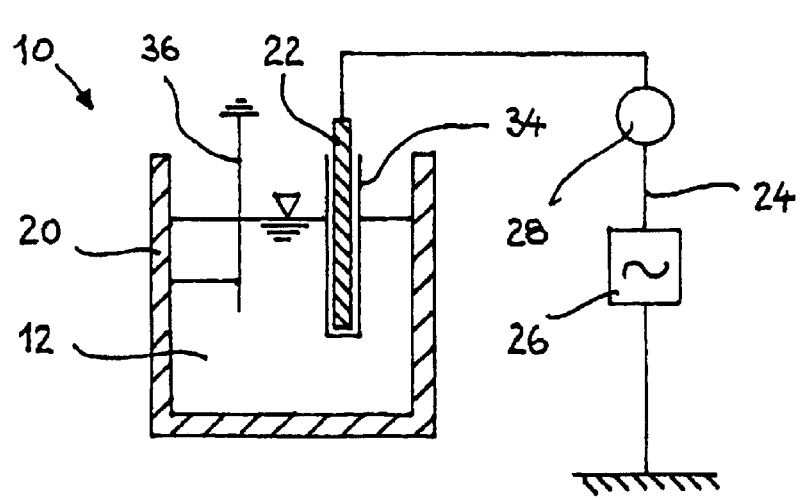
FIG. 3 shows a sectional drawing of another variation.

FIG. 3 shows another variation, in which the sensor 22 is submerged in the contents 12. If the contents are electrically conductive, the sensor 22 must be insulated from the contents by a nonconductive jacket 34. The wall 20 of the container 10 may consist of any desired material, which may be conductive or nonconductive. In addition, it is possible to connect the contents 12 and/or the container 10 to a ground 36.

In the variation shown in FIG. 3, the alternating voltage source 26 also generates an electric field at the sensor 22, which varies with the level and can be measured and displayed at the measuring device 28.

As an alternative to inserting the sensor 22 in the contents 12 or mounting it on the wall 20 of nonconductive material, there is also the possibility of embedding the sensor 22 in the outer wall 20 at the time of manufacture of the container 10. The sensor 22 may also be enclosed in an insulating jacket 34 and mounted directly on the inner surface of the wall 20.

Naturally, in the system shown in FIG. 3, if the contents 12 and the wall 20 are electrically nonconductive, the jacket 34 of the sensor 22 is unnecessary.

Figure 4:
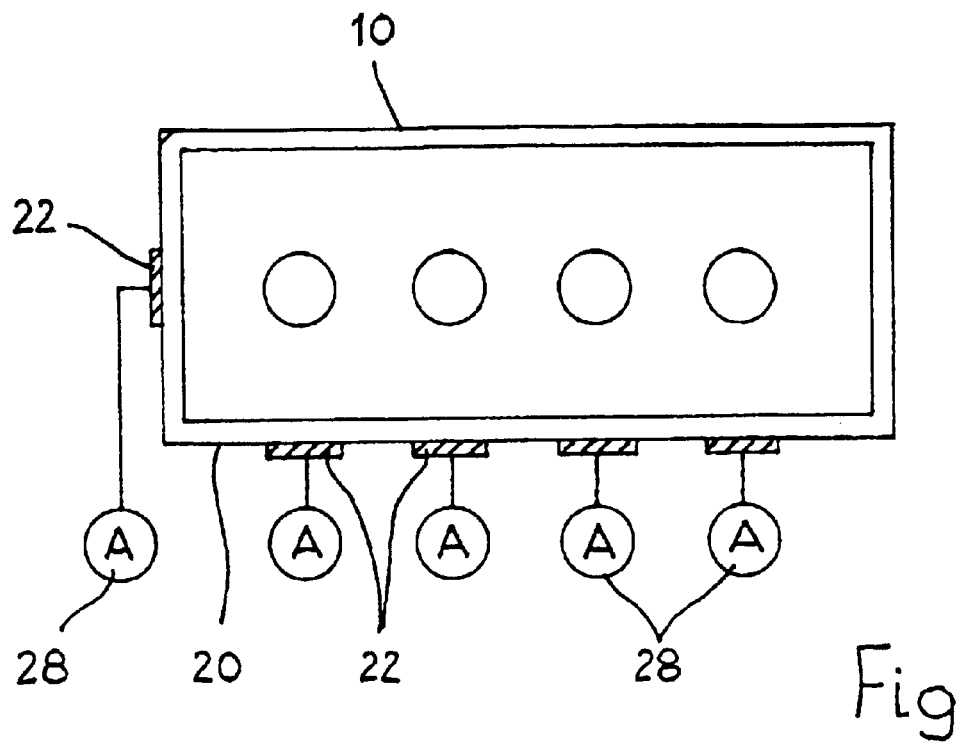
FIG. 4 shows a schematic top view of a container with several sensors.

FIG. 4 shows a top view of a container 10, which is equipped with sensors 22 at several places on its wall 20. Each sensor 22 may have its own measuring device 28, or all of the sensors 22 may have a common measuring device 28, so that the filling level of the container 10 can be determined at different places. A mean value can be formed electronically from the different sensor signals, so that the filling level of the container 10 can be displayed with the desired accuracy even when the contents 12 of the container are in a state of motion. A typical application for this sensor system is a fuel tank in an aircraft.

Figure 5:
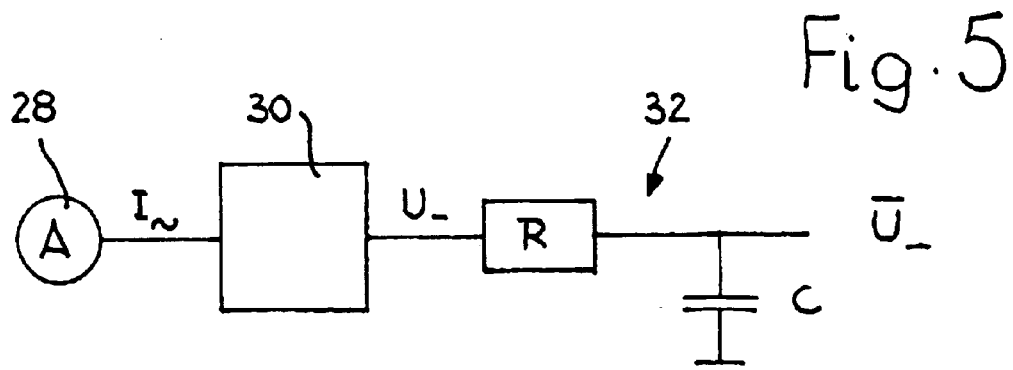
FIG. 5 shows an example of a circuit with a low-pass filter for use in the example of FIG. 4.

To form the mean value, an RC low-pass filter with a time constant of a few seconds can be used, which is sketched in FIG. 5. With the use of a rectifier 30, the alternating current signal of the sensor 22 is supplied as direct current with voltage U to the low-pass filter 32, which consists of resistor R and capacitor C, from which it is displayed as the level without components with frequencies above f=1/RC of a few tenths of a Hertz. When a mean value is formed from the signals of several sensors 22 that have been processed in this way, an exact filling level is obtained, even if the container 10 is moving and its contents are sloshing about.

Figure 6:
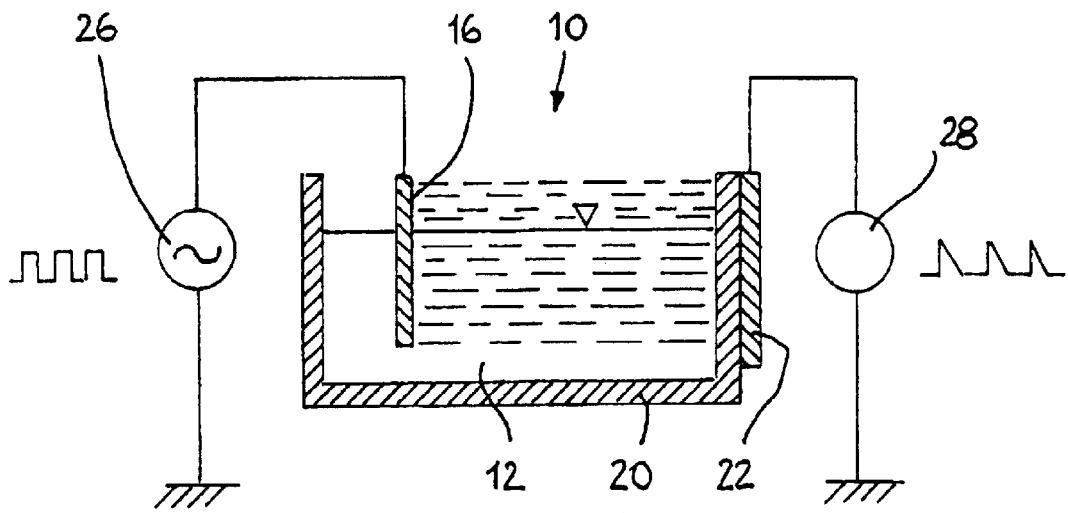
FIG. 6 shows a sectional drawing of another example of an application.
Figure 7:
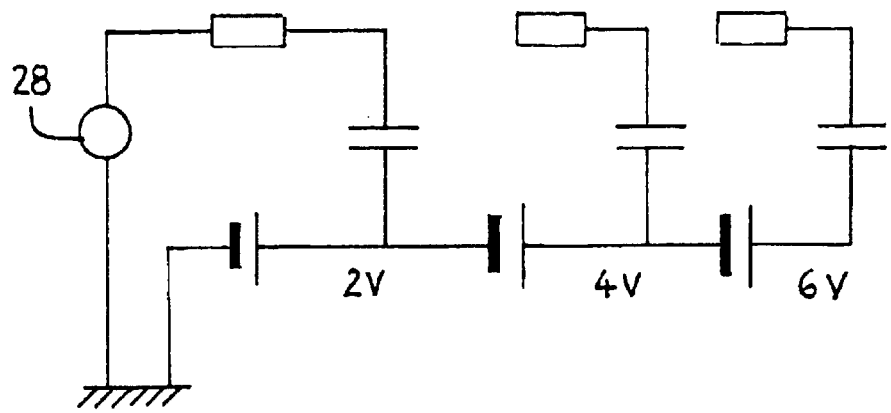
FIG. 7 shows a circuit diagram derived from the application example in FIG. 6.

FIGS. 6 and 7 are schematic representations of another possible application, in which the capacitive sensor 22 is used as a passive sensor. It is mounted on the nonconductive outer wall 20 of the container 10, for example, a battery cell. An electric voltage change is produced in the electrolyte of the cell by pulse charge or pulse discharge—indicated by the square-wave voltage at the voltage source 26. This produces an electric field between the electrolyte 12 and the sensor 22, which leads to a capacitive current consumption of the sensor 22, which varies as a function of the filling level of the electrolyte 12. After suitable calibration of the system, this variation can be displayed in analog or digital form as the filling level of the electrolyte.

When the battery is repeatedly discharged for short periods of time, the pulse originating from the electrolyte and thus the capacitive current consumption of the sensor 22 decrease as a function of the charge state of the battery. After suitable calibration of the system, this decrease can provide information about the current residual charge of the battery, and this residual charge can be displayed.

After complete charging of a battery that is no longer new, the method that has just been described can be used to determine the actual residual capacity of the battery from the capacitive current consumption of the sensor 22, and, after comparison with the original rated capacity, the residual capacity can be displayed as a fraction of the original rated capacity. This display informs the user of the current general condition of the battery.

FIG. 7 shows schematically the possible application illustrated in FIG. 6 for a battery with three cells.

The use of the sensor as a passive sensor is not limited to batteries, but rather applications are conceivable in which an alternating voltage is supplied to the contents of the container from the outside to allow a determination of the level or other variable properties of the contents from the capacitive current consumption of the sensor.

The method and device in accordance with the invention can be used in many fields to measure filling levels, for example, in production processes, in medicine, e.g., to monitor infusions or the like, in laboratories, or in battery monitoring. As has already been mentioned, the measuring results determined with the use of the sensor can be used to control filling level corrections and to trigger warning signals when critical filling levels are reached.

In this vein, FIG. 8 shows schematically a container 10, which is designed as a battery case and contains liquid 12 (electrolyte). The cover 14 of the container 10 is provided with a liquid supply line 38, which is used for supplying 40 liquid (distilled water) to the container 10, when the level of liquid in the container has dropped below a prescribed minimum height h'.

An expanded section 42 of the liquid line 38 contains a valve 44, which is controlled by an actuating device 46. In the embodiment illustrated here, the actuating device 46 may operate electromagnetically, so that an electric signal line 48 is used for control.

A capacitive level sensor 22 is mounted on the outer wall 20 of the container 10. It continuously measures the height h' of the liquid 12 in the container 10 and sends an electric signal to an electronic control unit 50, which is also mounted outside the container 10, when the liquid level has fallen below a prescribed minimum height. A voltage source 52 supplies current to both the control unit 50 and the sensor 22.

However, there is also the possibility of providing a level sensor 22 that receives optical, acoustic, pneumatic, or hydraulic measuring signals according to the filling level, which are then converted to electric control signals in the control unit 50 and passed through the signal line 48 to the actuating device 46.

When the level of liquid 12 in the container 10 has dropped below the minimum height h', the sensor 22 emits a signal, which is passed by the control unit 50 to the electromagnetic actuating device 46 through the signal line 48. This causes the valve 44 to be lifted into the open position shown in FIG. 8, so that liquid is fed into the container 10 through the liquid line 38 in the direction indicated by the arrows. As soon as the prescribed level has been reached again, the actuating device 46 receives a control signal from the sensor 22 via the control unit 50, and the valve is closed again.

In the embodiment shown in FIG. 9, the container 10 is a water tank for a toilet, which is filled with water as the liquid 12. The electronic control unit 50 with its voltage source 52 is mounted on the cover 14 of the tank 10. The electronic control unit 50 is connected by a signal line 56 with the sensor 22, which, here again, is mounted on the outside wall 20 of the tank 10.

The liquid supply line 38 for supplying 40 water opens into the tank 10 through the cover 14. The valve 44, which is mounted in the expanded section 42 in such a way that it can be moved vertically, is used to control the inflow 40 of water into the tank 10. Here again, the actuating device 46 of the valve 44 is controlled by the sensor 22 through the signal line 48 and the electronic control unit 50.

In the bottom 58 of the tank 10, there is another liquid line 38' with a valve 44, which controls the discharge 60 of the water. The actuating device 46 of this valve 44 is also connected to the control unit 50 by an electric signal line 48'.

A system similar to FIG. 8 is suitable for water storage tanks on the roofs of residential buildings, which, for example, are supplied at night with water from the municipal waterworks.

What is claimed is:

1. A method of measuring the level of the contents of a container, said method comprising:
    providing a capacitor consisting of a plurality of passively acting sensors and the contents of the container at different places in or on the container;
    connecting an alternating voltage source to the plurality of sensors by respective electric lines;
    one of applying an alternating voltage to, and generating an alternating voltage in, the contents of the container via the lines;
    measuring the current in the lines as a measure of the capacitance of the capacitor;
    forming a mean value of the capacitance; and
    displaying the mean value of the capacitance as a measure of the level of the contents in the container.

2. A method as in claim 1 wherein said plurality of sensors is mounted on a wall of said container and extends over expected levels of the contents of said container.

3. A method as in claim 2 wherein said wall is an electrically nonconductive material and said sensor is mounted on the outside of said wall.

4. A method as in claim 2 wherein said contents are connected to ground.

5. A method as in claim 4 wherein said alternating voltage source is grounded separately from the contents of the container.

6. A method as in claim 1 wherein said plurality of sensors is submerged in said contents and is electrically insulated from said contents.

7. A method as in claim 1 wherein the current in the lines to the sensors is measured by an RC low-pass filter circuit having a time constant of at least two seconds.

8. A method as in claim 1 further comprising automatically correcting the filling level based on said capacitance.

9. Apparatus for measuring the level of contents in a container, said apparatus comprising:

a container comprising a battery case with an electrolyte;

a capacitive sensor circuit comprising a sensor mounted on or in the container so that said sensor and the contents of the container form a capacitive circuit;

an alternating voltage source connected to the sensor by an electric line and generating one of a pulse charge and a pulse discharge in the contents; and a measuring device connected in the line for determining the capacitance of the circuit by measuring the current in the line to the sensor; and means for displaying the determined capacitance of the circuit as a level of the contents in the container.

10. Apparatus as in claim 9 wherein said container comprises a wall made of an electrically nonconductive material, said wall having an outside facing oppositely from said contents, said sensor being mounted on said outside of said wall and extending over expected levels of the contents of said container.

11. Apparatus as in claim 9 wherein said sensor is an active sensor, said apparatus further comprising means for grounding the contents of the container.

12. Apparatus as in claim 11 wherein said alternating voltage source is grounded.

13. Apparatus as in claim 9 wherein the contents of the container are not grounded.

14. Apparatus as in claim 9 further comprising:

an actuating device connected to said sensor by a signal line; and a valve installed in a line for refilling the container with fresh contents, said valve being actuated by said actuating device.

15. Apparatus as in claim 14 wherein said sensor emits output signals as a function of the level of contents in said container, said output signals serving as control signals for said actuating device.

16. Apparatus as in claim 15 further comprising an electronic control unit which receives said outputs signals and generates said control signals.

17. Apparatus as in claim 16 wherein said electronic control unit generates electric control signals for said actuating device.

18. Apparatus as in claim 14 wherein said actuating device is one of an electric and an electromagnetic actuating device.

* * * * *